United States Patent [19]

Harrington

[11] Patent Number: 4,483,207

[45] Date of Patent: Nov. 20, 1984

[54] CAGING MECHANISM FOR GYROSCOPES

[76] Inventor: James N. Harrington, 16633 W. 145th Ter., Olathe, Kans. 66062

[21] Appl. No.: 268,902

[22] Filed: Jun. 1, 1981

[51] Int. Cl.³ .................. G01C 19/26; G01C 19/30
[52] U.S. Cl. .................................. 74/5.14; 74/5.1; 74/5.41
[58] Field of Search .............. 74/5.14, 5.1, 5.9, 5.41, 74/5.45, 99 A

[56] References Cited

U.S. PATENT DOCUMENTS

| | | | |
|---|---|---|---|
| 1,946,657 | 2/1934 | Zand | 74/5.14 X |
| 2,182,534 | 12/1939 | Brandt | 74/5.1 |
| 2,207,850 | 7/1940 | Brandt | 74/5.14 |
| 2,207,875 | 7/1940 | Roland | 74/5.14 |
| 2,406,342 | 8/1946 | Beach et al. | 74/5.14 |

FOREIGN PATENT DOCUMENTS

| | | | |
|---|---|---|---|
| 764724 | 9/1952 | Fed. Rep. of Germany | 74/5.1 |
| 471217 | 4/1937 | United Kingdom | 74/5.14 |

Primary Examiner—Rodney H. Bonck

[57] ABSTRACT

A caging mechanism for caging the inner gimbal of a directional gyroscope to a horizontal position. Depression of an actuator rod turns a caging disc which is simultaneously moved linearly toward the inner gimbal by an angled ramp surface. A pair of pins pushed by the disc have enlarged heads that act against cams on the inner gimbal to provide the caging action. The actuator rod is equipped with an override spring that cushions the caging force and permits additional depression of the rod for caging of the outer gimbal.

18 Claims, 4 Drawing Figures

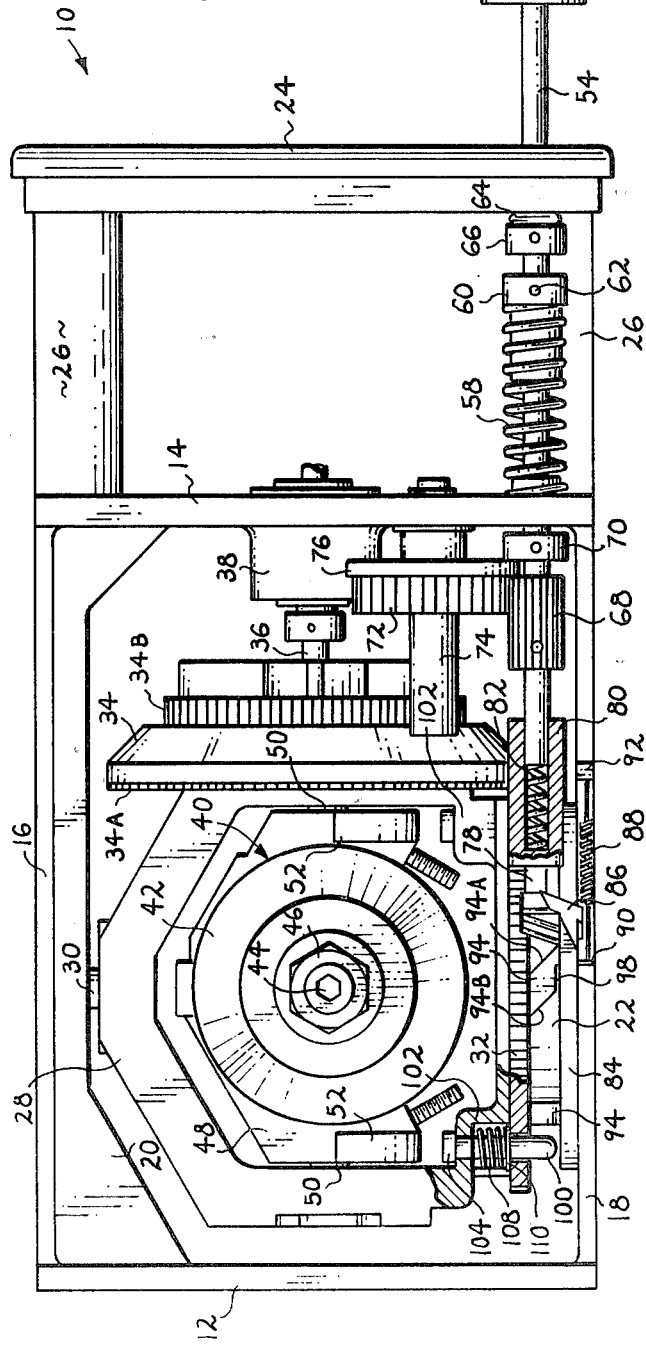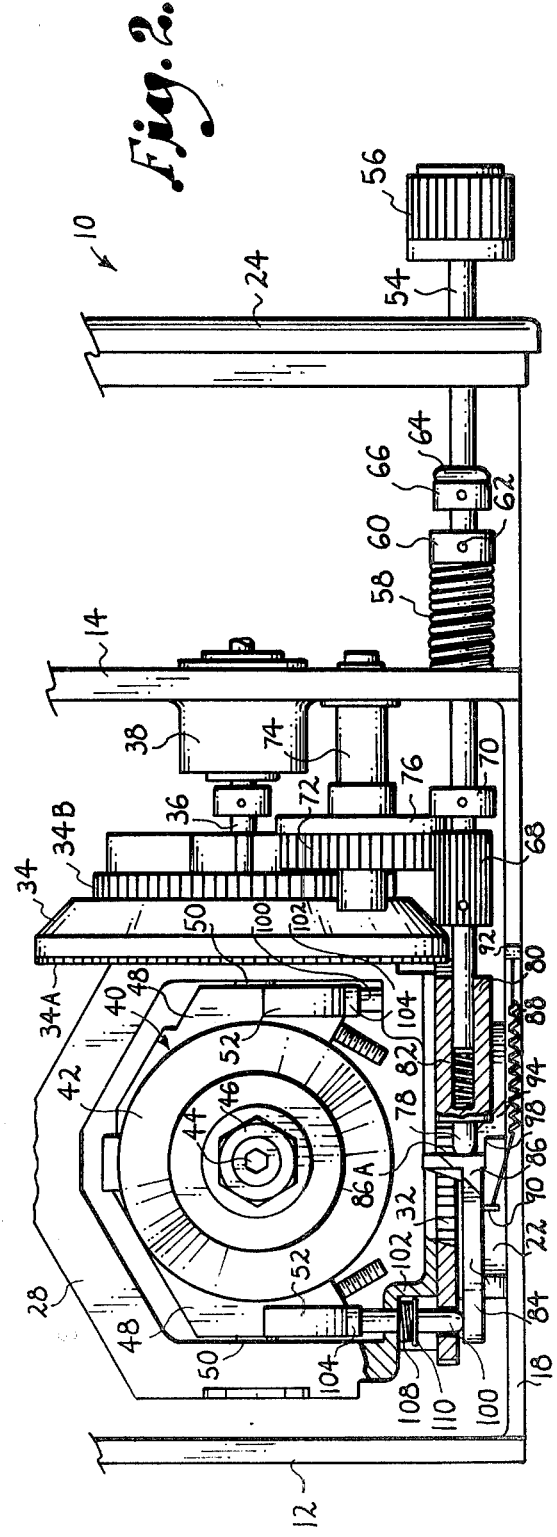

CAGING MECHANISM FOR GYROSCOPES

BACKGROUND OF THE INVENTION

This invention relates generally to gyroscopes and more particularly to an improved caging mechanism which serves to effect caging of the inner gyroscope gimbal.

Gyroscopes used in avionics have long been equipped with caging mechanisms which are used to "cage" or rotate the inner gimbal to the orientation necessary for proper operation of the instrument. For example, in directional gyroscopes, the inner gimbal must be caged such that the spin axis of the rotor is oriented horizontally. Following release of the caging mechanism, rotation of the rotor retains the inner gimbal in the proper horizontal orientation during operation of the gyroscope instrument.

Typically, existing caging mechanisms are highly complex devices having a large number of cooperating mechanical parts such as pivot plates, cams, caging arms and the like. Aside from complicating the gyroscope unduly and adding to the expense and to the assembly difficulties, these components also require precision machining and have close tolerance requirements. Furthermore, frequent replacement and/or repair of the parts is necessary and the likelihood of mechanical problems is increased substantially. Due to the tendency for existing caging mechanisms to cage the inner gimbal rather abruptly, the gimbal bearings and other sensitive components of the instrument are exposed to severe stress which can cause significant damage. Another difficulty results from the high angular momentum that builds up in the spinning rotor. The gyroscope strongly resists attempts to rotate the inner gimbal during caging, and, due to the gyroscope principle, the outer gimbal and its bearings are subjected to forces which can lead to damage, particularly to the sensitive low friction bearings. Additional problems associated with the caging mechanisms that have been used in the past include lack of reliability, jerky operation in both the caging action and release, and the possibility of inadvertent interference with the gimbals due to vibration or other forces acting on the caging device.

SUMMARY OF THE INVENTION

The present invention is aimed at eliminating or at least minimizing these problems and has, as its primary goal, the provision of an improved caging mechanism for gyroscopes that are used in avionics applications. In accordance with the invention, an actuating rod may be pushed in to rotate a caging disc. Cooperating ramp surfaces on the caging disc and frame cause the disc to be forced toward the inner gimbal simultaneously with its rotation. The disc thereby pushes a pair of pins against cams carried on the inner gimbal. The resultant camming action causes the inner gimbal to be rotated until the spin axis of the rotor is oriented in a horizontal position.

Smooth operation of the caging mechanism is assured by the action of a pair of parallel ramp surfaces on each ramp member which cooperate with corresponding edges of the openings in the caging disc which receive the ramp members. This dove tail type arrangement counteracts any tendency of the caging disc to become cocked or skewed on its support. The back surface of each ramp member has a notch which receives the back edge of the corresponding disc opening to provide a detent arrangement that resists vibration and other forces tending to dislodge the disc from its normal position.

Two important functions are served by the override spring which forms part of the actuating rod assembly. The override spring effects cushioning of the caging action in order to protect the gimbal bearings and other sensitive components of the gyroscope. Also, the spring permits the actuating rod to be depressed far enough to engage the outer gimbal after the inner gimbal has been caged. Thus, the inner gimbal can be caged before the outer gimbal is rotated.

BACKGROUND AND SUMMARY OF THE INVENTION

In the accompanying drawings which form a part of the specification and are to be read in conjunction therewith and in which like reference numerals are used to indicate like parts in the various views:

FIG. 1 is a side elevational view of a directional gyroscope having a caging mechanism constructed according to a preferred embodiment of the present invention, with the caging mechanism in the release position and portions broken away for purposes of illustrations;

FIG. 2 is a fragmentary side elevationaly view similar to FIG. 1, but with the inner gimbal caged and the outer gimbal released;

Figure 3:
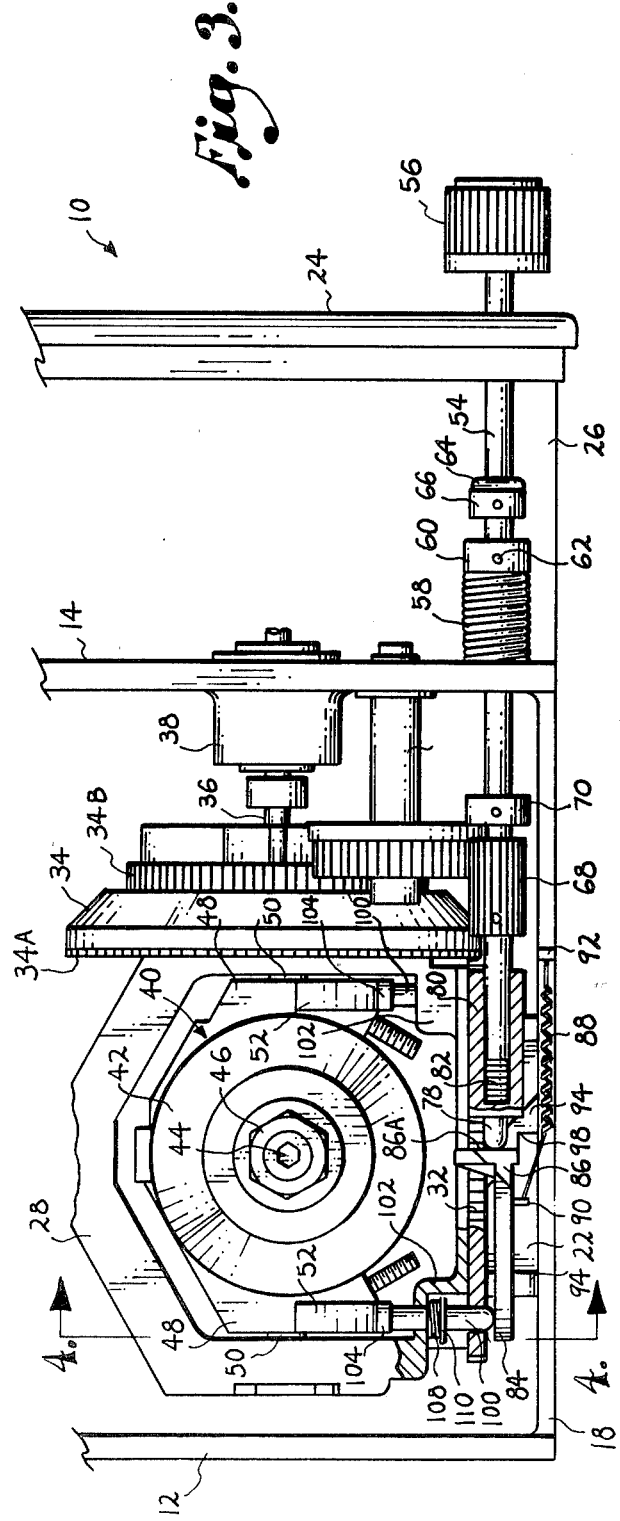
FIG. 3 is a side elevational view similar to FIGS. 1 and 2, but with both the inner and outer gimbals caged; and the mating gears engaged.

Referring now to the drawings in more detail, reference numeral 10 generally designates a directional gyroscope of the type used in avionics applications. The frame of the gyroscope includes a pair of parallel plates 12 and 14 which are interconnected at their top edges by an upper panel 16 and at their bottom edges by a lower panel 18. The upper panel 16 has a boss 20 extending along its length and thickened at its connection with plate 12. A circular boss 22 is formed on the upper surface of the lower panel 18. The gyroscope also includes a display panel 24 which is parallel to plate 14 and is spaced therefrom by four bars 26. A cover (not shown) normally covers the gyroscope frame while leaving the display panel 24 exposed.

The outer gimbal 28 of the gyroscope is mounted to the frame for rotational movement about a vertical axis defined by a pin 30 which extends from boss 20 and an aligned pin (not shown) which extends from the lower boss 22. Pin 30 and the aligned pin are received in low friction bearings mounted on the outer gimbal. The lower end of the outer gyroscope gimbal 28 carries a gear wheel 32 having teeth which mate with teeth 34A formed in the face of a gear 34 oriented perpendicular to gear 32. Gear 34 has a second set of teeth 34B on its peripheral surface. Gear 34 is mounted on one end of a horizontal shaft 36 which extends through a boss 38 formed on plate 14. Suitable low friction bearings (not shown) are mounted in boss 38 to support shaft 36 for rotation. The end of shaft 36 opposite gear 34 carries a display disc (not shown) which is located adjacent a transparent portion of the display panel 24. Relative rotation between the outer gimbal 28 and the gyroscope frame causes gear 34 to rotate due to its mating connection with gear 32, and the display disc (not shown)

rotates along with gear 34 to display the heading of the aircraft on a transparent portion of the display panel 24.

The inner gimbal of the gyroscope is generally designated by numeral 40. The inner gimbal 40 includes a generally cylindrical casing 42 which is covered at both ends and which contains the rotor (not shown) of the gyroscope. The rotor is carried on a shaft (not shown) which is supported for rotation by suitable low friction bearings mounted within the casing 42. The shaft provides the spin axis of the rotor and is coaxial with threaded studs 44 which are secured on opposite ends of the case by nut 46 (one end has the rotor shaft threaded into the inner gimbal with nut 46 being on only one end thereof). The inner gimbal 40 is provided with bosses 48 on its opposite sides. The bosses 48 are equipped with low friction bearings (not shown) which receive coaxial pins 50 extending from the outer gimbal 28. The inner gimbal 40 is thus mounted to rotate relative to the outer gimbal 28 about the horizontal axis defined by pins 50. The rotational axis for the inner gimbal is perpendicular both to the rotational axis for the outer gimbal and to the spin axis of the rotor.

Figure 4:
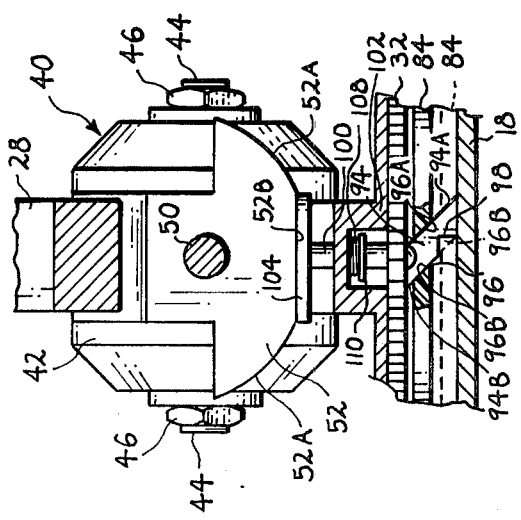
FIG. 4 is a fragmentary cross sectional view on an enlarged scale taken generally along line 4—4 of FIG. 3 in the direction of the arrows.

The inner gimbal 40 includes a pair of cams 52 which are integral with the bosses 48. As best shown in FIG. 4, each cam 52 is generally semicircular and has a pair of arcuate surfaces 52A and a flat surface 52B located between the arcuate surfaces 52A. The flat surfaces 52B of the cams are oriented parallel to the spin axis of the rotor.

In accordance with the present invention, the gyroscope is equipped with a caging mechanism which serves to cage the inner gimbal in a manner to orient the spin axis of the rotor in a horizontal position. The caging mechanism includes an elongate actuating rod 54. Rod 54 is parallel to shaft 36 and extends through plate 14 and the display panel 24 near one corner thereof. Shaft 54 is supported for axial movement between the positions shown in FIGS. 1 and 3, and it may also be rotated. The outer or free end of rod 54 projects outwardly beyond the display panel 24 and is provided with a knurled knob 56 which facilitates depression of the rod inwardly as well as rotation of the rod.

A compression spring 58 is coiled around 54, with one end of the spring acting against plate 14 and the opposite end acting against a collar 60 which is mounted on the rod and secured by a set screw 62. The force of spring 58 continuously urges rod 54 outwardly to the release position shown in FIG. 1. A stop 64 is mounted on rod 54 and held by a collar 66. Stop 64 engages the display panel 24 to seal the inside against air leaks and to limit outward movement of the rod to the position shown in FIG. 1.

Rod 54 carries a small pinion 68 and a collar 70 which is spaced slightly outwardly of the pinion. A gear wheel 72 which engages pinion 68 is mounted for rotation and for sliding movement on a shaft 74 extending from plate 14. Gear 72 meshes with pinion 68 and is provided with an enlarged flange 76, the periphery of which is closely received in the gap formed between pinion 68 and collar 70. As a consequence, axial movement of rod 54 effects corresponding movement of gear 72 along shaft 74. In addition, rotation of rod 54 effects turning of gear 72 due to the meshing engagement between pinion 68 and gear 72.

The actuating rod assembly includes a small stud 78 which essentially forms an axial extention of rod 54. As best shown in FIGS. 2 and 3, stud 78 has a rounded end. A hollow sleeve 80 is integral with stud 78 and receives the free inner end of rod 54. An override spring 82 is received within sleeve 80 and acts against sleeve 80 at one end and the end of rod 54 at the opposite end. The override spring 82 is a compression spring which urges rod 54 and stud 78 away from one another.

A caging disc 84 is received on boss 22 in a manner permitting the disc to rotate on the boss and to slide thereon toward and away from the inner gimbal 40 of the gyroscope. Extending outwardly from the periphery of disc 84 is a short arm 86 having a flat surface 86A which contacts the rounded end of stud 78 (see FIGS. 2 and 3 in particular). Surface 86A is low friction surface which, in cooperation with the rounded end of stud 78, minimizes the friction between stud 78 and arm 86. A tension spring 88 urges disc 84 in a direction to maintain arm 86 against stud 78 at all times. One end of spring 88 is hooked to an ear 90 projecting from the caging disc 84, while the opposite end of the spring is secured to a lug 92 formed on panel 18.

When rod 54 is pushed inwardly, the force of stud 78 pushing against arm 86 causes disc 84 to rotate. This rotational movement of disc 84 is translated into accompanying linear movement of the disc by four ramps 94 which are spaced equaidistantly around the circumference of boss 22 in a circular arrangement centered about the outer gimbal rotational axis. Each ramp 94 is identical, and each ramp extends through an opening in disc 84, one of the openings being indicated at 96 in FIG. 4.

With continued reference to FIG. 4, each ramp 94 includes a pair of parallel ramp surfaces 94A and 94B which are both oriented at approximately 45 degrees relative to the rotational axis of the outer gimbal 28. The ramp surfaces 94A and 94B of each ramp are adjacent to and normally in contact with respective edges 96A and 96B of the corresponding opening 96. Ramp surface 94B of each ramp has a notch 98 located adjacent the lower frame panel 18. As indicated in broken lines in FIG. 4, edge 96B registers with and is received in notch 98 when disc 84 is located against panel 18.

The caging mechanism includes a pair of pins 100 which are carried on hollow blocks 102 forming part of the outer gimbal 28. The blocks 102 are integral with the outer gimbal and are located at the points of intersection between the outer gimbal and gear 32. The pins 100 are received for axial sliding movement on blocks 102 toward and away from the cams 52. Each pin 100 has a rounded lower end which is in contact with the flat upper surface of the caging disc 84 (only during the caging action). On its top end, each pin has an enlarged flat head 104 located above the block 102. A compression spring 108 is mounted within the hollow interior of each block 102 to continuously urge the corresponding pin 100 downwardly or away from cam 52. One end of each spring 108 acts against the internal surface of the corresponding block, while the opposite end of the spring engages an enlarged ring 110 secured to the pin.

In use, the caging mechanism serves to cage the gyroscope gimbals such that the gyroscope axes are oriented properly. To cage the inner gimbal, knob 56 is depressed to push rod 54 inwardly from its normal release position shown in FIG. 1. The corresponding inward movement imparted to stud 78 causes the stud to push against arm 86, thus rotating the caging disc 84 from the position of FIG. 1 to the position of FIG. 2. During rotation of the disc, the front edge 96A of each opening 96 engages ramp surface 94A of the corresponding ramp in camming fashion to force the disc to move upwardly toward the inner gimbal from the position shown in broken lines in FIG. 4 to the solid line position of FIG. 4.

As the caging disc 84 is thus moved toward the inner gimbal, its flat upper surface pushes against the rounded ends of pins 100 to slide pins upwardly in unison toward cams 52. If the inner gimbal 40 is oriented such that the rotor spin axis is other than horizontal, the head 104 of each pin contacts one of the arcuate surfaces 52A of the corresponding cam. Continued upward movement of pins 100 causes the heads 104 to act against surfaces 52A in camming fashion, thereby rotating the inner gimbal until the heads 104 are in flat contact with the flat surfaces 52B of the cams 52. This is the position shown in FIG. 4, and, since surfaces 52B are parallel to the rotor spin axis, the inner gimbal is caged to orient the spin axis in a horizontal position.

The inner gimbal is caged in this manner when rod 54 is pushed inwardly to the caging position shown in FIG. 2. It is noted that in this position of the rod, gear 72 has not been moved inwardly far enough to mesh with the gear teeth 34B of gear 34. Consequently, the inner gyroscope gimbal can be caged without effecting engagement between gears 72 and 34. However, rod 54 can be depressed additionally to the position of FIG. 3 in order to engage gear 72 with the gear teeth 34B thereby caging the outer gimbal. Due to the ability of the override spring 82 to compress, such additional depression of rod 54 has no effect on the caging of the inner gimbal. Once it has been caged, the outer gimbal 28 cannot turn except in response to turning of rod 54 as effected by turning knob 56. Knob 56 can be turned to rotate the outer gimbal to the desired position through the gear train consisting of gears 68, 72, 34, and 32.

The gimbals can be released from either the FIG. 2 or the FIG. 3 position simply by releasing knob 56. Spring 58 then returns rod 54 to the release position shown in FIG. 1. Gear 72 is thus disengaged from teeth 34B, while spring 88 rotates disc 84 to the position of FIG. 1. As the disc rotates, edges 96B engage ramp surfaces 94B of the ramps in a manner to back the disc away from the inner gimbal to the broken line position of FIG. 4. Springs 108 force pins 100 downwardly or away from cams 52, and the inner gimbal is thus released although it continues to remain in a horizontal position due to the continued rotation of the rotor. When the caging disc 84 has been fully released, it engages panel 18 and edges 96B are received in the corresponding notches 98 to provide a detent effect which prevents the caging disc from being inadvertently dislodged due to vibration or other forces applied to the instrument.

In addition to permitting the inner gimbal to be caged either with or without accompanying caging of the outer gimbal, the override spring 82 cushions the caging force applied to the inner gimbal. If rod 54 is pushed inwardly with undue force, the cushioning effect provided by spring 82 prevents the force from being fully applied to the inner gimbal and thus prevents possible damage to the sensitive low friction bearings which support the inner gimbal. Also, as heads 104 of pins 100 act against the arcuate camming surfaces 52A to effect caging of the inner gimbal with the rotor spinning, the high angular momentum which resists rotation of the inner gimbal applies forces to the bearings of the outer gimbal due to the gyroscope principle. However, these forces are cushioned to protect the sensitive bearings of the outer gimbal since spring 82 permits the actuator rod assembly to be back driven, thus cushioning the forces resulting from the high angular momentum of the rotor and preventing possible damage to the bearings as can occur in existing caging mechanisms. In this manner, the override spring 82 provides smoother and less abrupt caging action and at the same time prevents damage to the bearings which could otherwise result due to the high angular momentum built up by the spinning rotor or excessive force applied to the actuating rod 54. In addition, after the inner gimbal has been caged, it is held in a flexible manner rather than a rigid manner due to the flexibility of spring 82.

The two ramp surfaces 94A and 94B cooperate with the corresponding edges 96A and 96B to provide smooth operation of the caging mechanism during both caging and release of the inner gimbal. In actual practice, it is contemplated that edge 96B will be spaced slightly from ramp surface 94B during caging of the inner gimbal. However, if the caging disc 84 begins to become cocked or skewed on its supporting boss 22, edge 96B moves into contact with surface 94B to resist further twisting of the disc, and the caging action is thus carried out in a smooth fashion. During backing off of disc 84 to effect release of the caging mechanism, there is normally a small gap between ramp surface 94A and edge 96A, but these surfaces come into contact with one another to quickly counteract any tendency for the caging disc to become twisted or skewed as it is being backed off. Release of the caging mechanism is thereby carried out in a smooth fashion due to the interaction between surfaces 94A and 96A and surfaces 94B and 96B.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a gyroscope having a frame and inner and outer gimbals mounted for rotation about mutually perpendicular axes, and improved caging mechanism comprising:

an elongate rod supported on the frame for axial movement and having one end accessible to effect axial movement of rod;

a caging disc supported on the frame to turn and to move generally linearly toward and away from the inner gimbal, said rod engaging said disc in a manner to effect turning movement thereof when the rod is moved toward the disc;

a ramp member on said frame presenting a ramp surface which interacts with a cooperating surface of said disc in a manner to effect linear movement of the disc toward the inner gimbal in response to turning of the disc;

a pin element supported for generally axial movement toward and away from the inner gimbal, said pin element having one end thereof contacted by said disc in a manner to force the pin element toward the inner gimbal in response to movement of the disc toward the inner gimbal;

cooperating cam means on said pin element and inner gimbal for effecting rotation of the inner gimbal to a predetermined orientation in response to movement of said pin element toward the inner gimbal, thereby caging the inner gimbal; and releasable detent means for holding the caging disc away from the inner gimbal in a non-caging position.

2. The invention set forth in claim 1, including spring means for urging said disc in a direction to maintain the disc in contact with said rod.

3. The invention set forth in claim 1, including an arm projecting generally outwardly from the periphery of said disc, said rod contacting said arm to effect turning of the disc when said rod is pushed toward the disc.

4. The invention set forth in claim 1, including spring means for urging said rod away from said disc.

5. The invention set forth in claim 1, wherein said rod includes a spring between said one end and the point of engagement between said rod and disc, said spring acting to cushion the caging force applied to the inner gimbal.

6. The invention set forth in claim 1, wherein said disc presents an opening therein which receives said ramp member, said opening having a first edge providing said cooperating surface of the disc and a second edge opposite said first edge.

7. The invention set forth in claim 6, including a surface of said ramp member parallel to said ramp surface and located adjacent said second edge of the opening to prevent cocking of the disc during movement thereof toward the inner gimbal and to provide smooth backing of the disc away from the inner gimbal.

8. The invention set forth in claim 7, wherein said detent means includes a notch in said parallel surface of the ramp member for engaging said second edge of the opening to provide a detent holding the disc away from the inner gimbal in said non-caging position.

9. The invention set forth in claim 1, including a plurality of additional ramp members on the frame spaced from one another and from the first mentioned ramp member in a circular arrangement about the outer gimbal axis, each of said additional ramp members presenting a ramp surface which interacts with a corresponding surface of the disc to cooperate in effecting linear movement of the disc toward the inner gimbal in response to turning of the disc.

10. In a gyroscope having a frame and inner and outer gimbals mounted for rotation about mutually perpendicular axes, an improved caging mechanism comprising:

an elongate rod supported on the frame for axial movement between a caging position wherein the inner gimbal is caged to a predetermined orientation and a release position wherein the inner gimbal is released, said rod having one end accessible to effect inward movement of the rod from the release position to the caging position;

a caging disc supported on the frame to turn and to move generally linearly toward and away from the inner gimbal, said caging disc being turned in response to axial movement of said rod and presenting a plurality of openings each bounded by an edge;

a plurality of ramps on said frame extending into the respective openings of said caging disc, each ramp having an incline generally planar ramp surface adjacent the edge of the corresponding opening to cause said edges to ride along the ramp surfaces in a manner to move the caging disc toward the inner gimbal when said disc is turned in response to inward movement of said rod;

cam means for rotating the inner gimbal to said predetermined orientation by caming action in response to movement of said disc toward the inner gimbal, thereby caging the inner gimbal upon inward movement of said rod to the caging position thereof; and spring means forming part of said rod and acting to cushion the caging force applied to the inner gimbal by said cam means upon movement of the rod to its caging position.

11. The invention set forth in claim 10, wherein:

said rod includes a first portion providing said one end and a second position forming an axial extension of said first portion, said second portion of the rod contacting said caging disc; and said spring means comprises a spring interposed between said first and second portions of the rod.

12. The invention set forth in claim 11, including a hollow member carried on one of said rod portions and receiving said spring therein, said spring contacting the other rod portion at a location interiorly of said hollow member and compressing upon movement of the rod portions toward one another.

13. The invention set forth in claim 10, wherein said cam means includes:

a cam member carried on the inner gimbal; and a pin element supported for axial movement toward and away from the inner gimbal and contacted by said caging disc and pushed toward the inner gimbal upon movement of said disc toward inner gimbal, said pin element providing a surface which interacts with said cam member to rotate said inner gimbal to said predetermined position in response to movement of the pin element toward the inner gimbal.

14. The invention set forth in claim 10, including resilent means urging said pin element away from the inner gimbal.

15. The invention set forth in claim 10, including resilent means urging said disc away from the inner gimbal.

16. The invention set forth in claim 10, including resilent means biasing said rod toward the release position thereof.

17. The invention set forth in claim 10, wherein:

the gyroscope includes a gear train having a first gear arranged to turn upon rotation of the outer gimbal relative to the frame;

said caging mechanism includes a second gear carried with said rod at a location disengaged from said first gear when the rod is in or between the release and caging positions; and said spring means permits inward depression of said rod beyond the caging position thereof to a position wherein said second gear is engaged with said first gear.

18. In a gyroscope having a frame and inner and outer gimbals mounted for rotation about mutually perpendicular axes, an improved caging mechanism comprising:

an elongate rod supported on the frame for axial movement and having one end accessible to effect axial movement of said rod;

a caging disc supported on the frame to turn and to move generally linearly toward and away from the inner gimbal, said rod engaging said disc in a manner to effect turning movement thereof in a first direction when the rod is moved toward the disc;

a plurality of uniformly spaced openings in said caging disc each presenting first and second spaced apart edges;

a plurality of ramps on said frame extending through the respective openings in said caging disc, each ramp having first and second substantially parallel ramp surfaces adjacent the respective first and second edges of the corresponding opening, whereby turning of the caging disc in said first direction moves said first edges along the corresponding first ramp surfaces to effect linear movement of the disc toward the inner gimbal in response to turning of the disc in said first direction;

yieldable spring means for urging said caging disc to turn in a second direction opposite said first direction to move said second edges along the corresponding second ramp surfaces to effect linear movement of the disc away from the inner gimbal when said rod is released;

a pair of pin elements supported for generally axial movement toward and away from the inner gimbal, said pin elements each having one end thereof contacted by said disc in a manner to force the pin element toward the inner gimbal in response to movement of the disc toward the inner gimbal; and cooperating cam means on said pin elements and inner gimbal for effecting rotation of the inner gimbal to a predetermined orientation in response to movement of said pin elements toward the inner gimbal, thereby caging the inner gimbal.

* * * * *